(12) United States Patent
Mamrak et al.

(10) Patent No.: US 10,828,700 B2
(45) Date of Patent: *Nov. 10, 2020

(54) TRIANGLE HATCH PATTERN FOR ADDITIVE MANUFACTURING

(71) Applicant: GENERAL ELECTRIC COMPANY, Schenectady, NY (US)

(72) Inventors: Justin Mamrak, Loveland, OH (US); MacKenzie Ryan Redding, Mason, OH (US)

(73) Assignee: General Electric Company, Schenectady, NY (US)

( * ) Notice: Subject to any disclaimer, the term of this patent is extended or adjusted under 35 U.S.C. 154(b) by 375 days.

This patent is subject to a terminal disclaimer.

(21) Appl. No.: 15/451,108

(22) Filed: Mar. 6, 2017

(65) Prior Publication Data

US 2018/0250743 A1    Sep. 6, 2018

(51) Int. Cl.
  *B22F 3/105*  (2006.01)
  *B33Y 10/00*  (2015.01)
  (Continued)

(52) U.S. Cl.
  CPC .......... *B22F 3/1055* (2013.01); *B33Y 10/00* (2014.12); *B33Y 30/00* (2014.12); *B33Y 50/02* (2014.12);
  (Continued)

(58) Field of Classification Search
  CPC ............ B22F 3/1055; B22F 2003/1057; B22F 2003/1056; B33Y 30/00; B33Y 10/00; B33Y 50/02; Y02P 10/295
  See application file for complete search history.

(56) References Cited

U.S. PATENT DOCUMENTS 4,863,538 A    9/1989 Deckard
5,460,758 A    10/1995 Langer et al.
(Continued)

FOREIGN PATENT DOCUMENTS

EP    1935620 A2    6/2008
EP    1 419 836 B2    10/2011
(Continued)

OTHER PUBLICATIONS

Dimension accuracy of metal components built by selective laser melting using EOS M280 (2/2), Inside Metal Additive Manufacturing, blog post, Sep. 5, 2015 (Year: 2015).*

(Continued)

*Primary Examiner* — Jessee R Roe
*Assistant Examiner* — Rebecca Janssen
(74) *Attorney, Agent, or Firm* — Dority & Manning, P.A.

(57) ABSTRACT

A scanning technique for the additive manufacturing of an object. The method comprises the irradiation of a portion of a given layer of powder to form a fused region using an energy source. When forming an object layer by layer, the irradiation follows a first irradiation path bounded by a first stripe, wherein the first irradiation path is formed at an oblique angle with respect to the first stripe. The first irradiation path further comprises at least a first scan vector and a second scan vector at least partially melting a powder and forming a first solidification line and second solidification line respectively, wherein the first solidification intersects and forms an oblique angle with respect to the second solidification line. After a layer is completed, a subsequent layer of powder is provided over the completed layer, and the subsequent layer of powder is irradiated. Irradiation of the subsequent layer of powder follows a second irradiation path bounded by a second stripe. wherein the second irradiation path is formed at an oblique angle with respect to the (Continued)

second stripe. The first irradiation path further comprises at least a third scan vector and a fourth scan vector at least partially melting a powder and forming a third solidification line and fourth solidification line respectively, wherein the third solidification intersects and forms an oblique angle with respect to the fourth solidification line.

14 Claims, 10 Drawing Sheets

(51) Int. Cl.
 *B33Y 30/00* (2015.01)
 *B33Y 50/02* (2015.01)
(52) U.S. Cl.
 CPC .............. *B22F 2003/1056* (2013.01); *B22F 2003/1057* (2013.01); *Y02P 10/25* (2015.11)

(56) References Cited

U.S. PATENT DOCUMENTS

| | | | |
|---|---|---|---|
| 5,855,718 | A | 1/1999 | Nguyen et al. |
| 5,965,079 | A | 10/1999 | Manners |
| 6,261,506 | B1 | 7/2001 | Nguyen et al. |
| 6,261,507 | B1 | 7/2001 | Gigl et al. |
| 6,264,873 | B1 | 7/2001 | Gigl et al. |
| 6,406,658 | B1 | 6/2002 | Manners et al. |
| 8,034,279 | B2 | 10/2011 | Dimter et al. |
| 9,011,136 | B1 | 4/2015 | Uzan et al. |
| 9,138,807 | B1 | 9/2015 | Takezawa et al. |
| 9,956,612 | B1 | 5/2018 | Redding et al. |
| 10,022,794 | B1 | 7/2018 | Redding et al. |
| 10,022,795 | B1 | 7/2018 | Redding et al. |
| 2002/0130112 | A1 | 9/2002 | Manasas et al. |
| 2004/0099996 | A1 | 5/2004 | Herzog |
| 2008/0241392 | A1* | 10/2008 | Dimter .................. B22F 3/1055 427/256 |
| 2014/0154088 | A1* | 6/2014 | Etter .................. B23K 15/0086 416/223 R |
| 2014/0332507 | A1 | 11/2014 | Fockele |
| 2015/0174823 | A1 | 6/2015 | Wiesner et al. |
| 2016/0001401 | A1 | 1/2016 | Dimter et al. |
| 2016/0075086 | A1 | 3/2016 | Stauffer |
| 2016/0167132 | A1 | 6/2016 | Panat |
| 2016/0184898 | A1 | 6/2016 | Kohav |
| 2016/0279706 | A1 | 9/2016 | Domrose et al. |
| 2016/0288209 | A1 | 10/2016 | Jakimov et al. |
| 2018/0200962 | A1 | 7/2018 | Redding et al. |
| 2018/0207722 | A1* | 7/2018 | Feldmann ............... B29C 64/20 |
| 2018/0250742 | A1* | 9/2018 | Mamrak ............... B22F 3/1055 |

FOREIGN PATENT DOCUMENTS

| | | |
|---|---|---|
| KR | 2015-0115598 A | 10/2015 |
| WO | WO 2016/201326 A1 | 12/2016 |
| WO | WO 2017/015241 A1 | 1/2017 |

OTHER PUBLICATIONS

International Search Report and Written Opinion issued in connection with corresponding PCT Application No. PCT/US2018/013975 dated May 1, 2018.

Redding, M.R., et al., Additive manufacturing using a selective recoater, GE Co-Pending U.S. Appl. No. 15/406,461, filed Jan. 13, 2017.

European Search Report Corresponding to Application No. 18764344 dated Sep. 4, 2020.

* cited by examiner

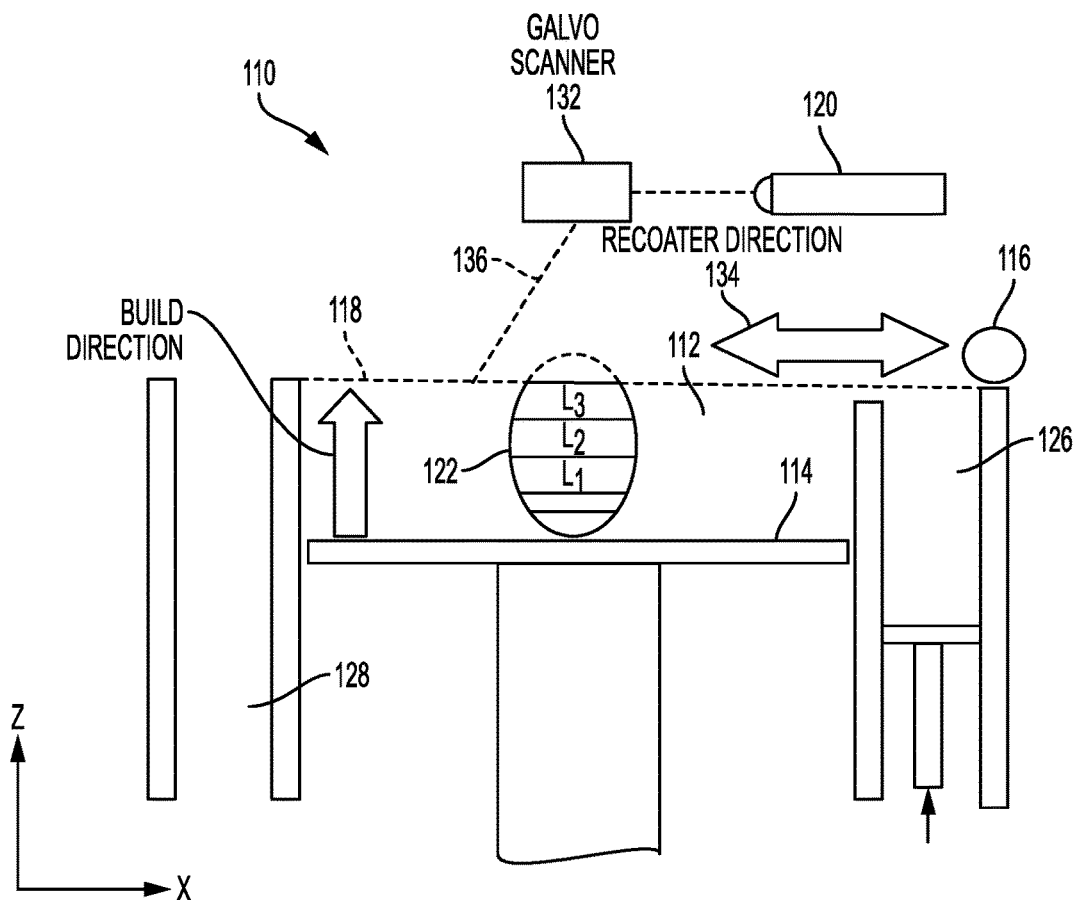
FIG. 1
PRIOR ART
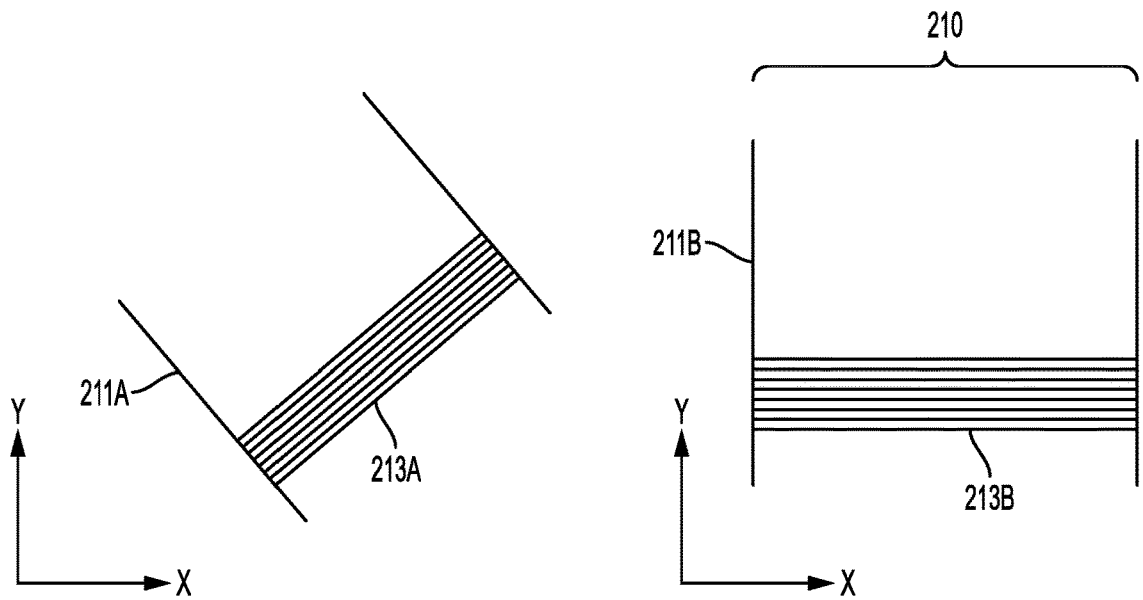
FIG. 2
PRIOR ART
FIG. 3
PRIOR ART

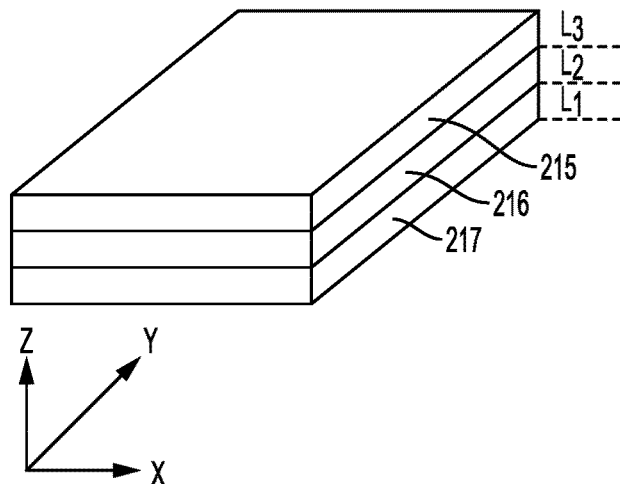
FIG. 4
PRIOR ART
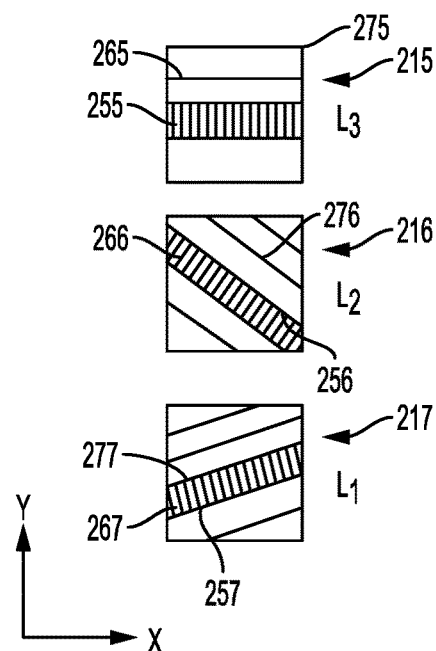
FIG. 5
PRIOR ART
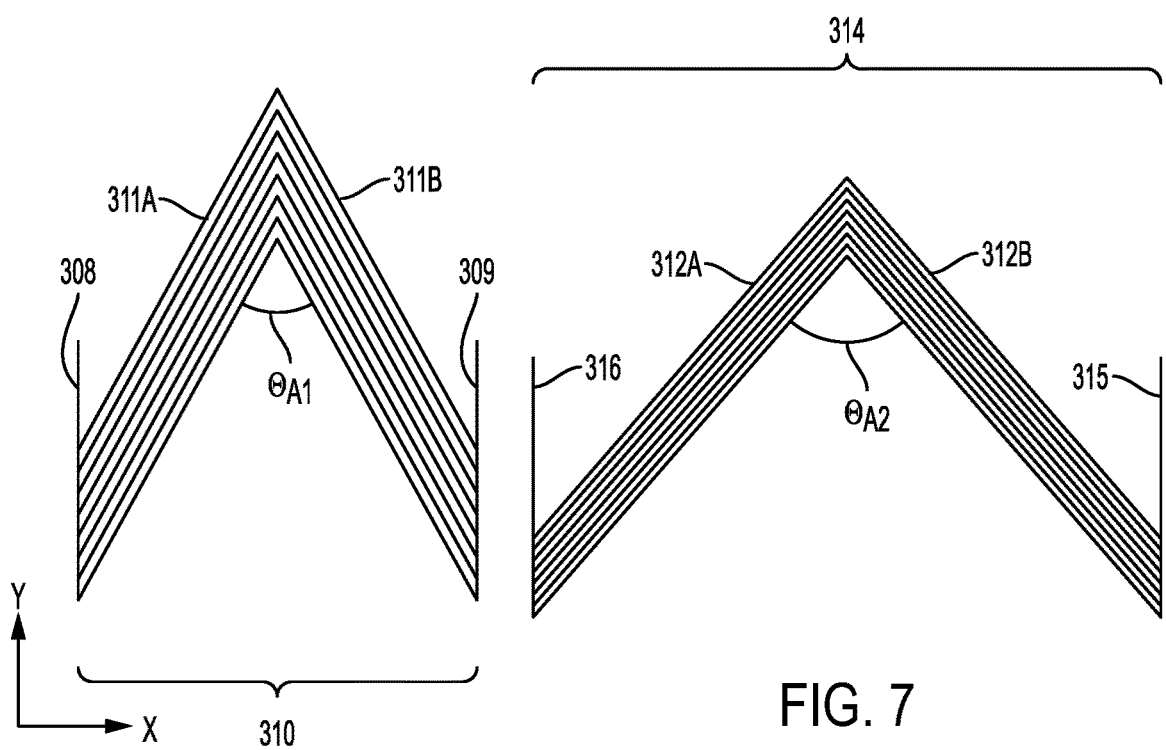
FIG. 6
FIG. 7

TRIANGLE HATCH PATTERN FOR ADDITIVE MANUFACTURING

INTRODUCTION

The disclosure relates to an improved method of producing components using an additive manufacturing technique. The disclosure provides an improved method of producing components, some of examples of which comprise: improved microstructure, decreased manufacturing time, decreased cost, decreased waste of materials. In particular, the disclosure relates to a process of scanning an energy beam (i.e., laser or e-beam) during a powder-based additive manufacturing build process.

BACKGROUND

Additive manufacturing (AM) techniques may include electron beam freeform fabrication, laser metal deposition (LMD), laser wire metal deposition (LMD-w), gas metal arc-welding, laser engineered net shaping (LENS), laser sintering (SLS), direct metal laser sintering (DMLS), electron beam melting (EBM), powder-fed directed-energy deposition (DED), and three dimensional printing (3DP), as examples. AM processes generally involve the buildup of one or more materials to make a net or near net shape (NNS) object in contrast to subtractive manufacturing methods. Though "additive manufacturing" is an industry standard term (ASTM F2792), AM encompasses various manufacturing and prototyping techniques known under a variety of names, including freeform fabrication, 3D printing, rapid prototyping/tooling, etc. AM techniques are capable of fabricating complex components from a wide variety of materials. Generally, a freestanding object can be fabricated from a computer aided design (CAD) model. As an example, a particular type of AM process uses an energy beam, for example, an electron beam or electromagnetic radiation such as a laser beam, to sinter or melt a powder material and/or wire-stock, creating a solid three-dimensional object in which a material is bonded together.

Selective laser sintering, direct laser sintering, selective laser melting, and direct laser melting are common industry terms used to refer to producing three-dimensional (3D) objects by using a laser beam to sinter or melt a fine powder. For example, U.S. Pat. Nos. 4,863,538 and 5,460,758 describe conventional laser sintering techniques. More specifically, sintering entails fusing (agglomerating) particles of a powder at a temperature below the melting point of the powder material, whereas melting entails fully melting particles of a powder to form a solid homogeneous mass. The physical processes associated with laser sintering or laser melting include heat transfer to a powder material and then either sintering or melting the powder material. Electron beam melting (EBM) utilizes a focused electron beam to melt powder. These processes involve melting layers of powder successively to build an object in a metal powder.

AM techniques, examples of which are discussed above and throughout the disclosure, may be characterized by using a laser or an energy source to generate heat in the powder to at least partially melt the material. Accordingly, high concentrations of heat are generated in the fine powder over a short period of time. The high temperature gradients within the powder during buildup of the component may have a significant impact on the microstructure of the completed component. Rapid heating and solidification may cause high thermal stress and cause localized non-equilibrium phases throughout the solidified material. Further, since the orientation of the grains in a completed AM component may be controlled by the direction of heat conduction in the material, the scanning strategy of the laser in an AM apparatus and technique becomes an important method of controlling microstructure of the AM built component. Controlling the scanning strategy in an AM apparatus is further crucial for developing a component free of material defects, examples of defects may include lack of fusion porosity and/or boiling porosity.

FIG. 1 is schematic diagram showing a cross-sectional view of an exemplary conventional system 110 for direct metal laser sintering (DMLS) or direct metal laser melting (DMLM). The apparatus 110 builds objects, for example, the part 122, in a layer-by-layer manner (e.g. layers L1, L2, and L3, which are exaggerated in scale for illustration purposes) by sintering or melting a powder material (not shown) using an energy beam 136 generated by a source such as a laser 120. The powder to be melted by the energy beam is supplied by reservoir 126 and spread evenly over a build plate 114 using a recoater arm 116 travelling in direction 134 to maintain the powder at a level 118 and remove excess powder material extending above the powder level 118 to waste container 128. The energy beam 136 sinters or melts a cross sectional layer (e.g. layer L1) of the object being built under control of the galvo scanner 132. The build plate 114 is lowered and another layer (e.g. layer L2) of powder is spread over the build plate and object being built, followed by successive melting/sintering of the powder by the laser 120. The process is repeated until the part 122 is completely built up from the melted/sintered powder material. The laser 120 may be controlled by a computer system including a processor and a memory. The computer system may determine a scan pattern for each layer and control laser 120 to irradiate the powder material according to the scan pattern. After fabrication of the part 122 is complete, various post-processing procedures may be applied to the part 122. Post processing procedures include removal of excess powder, for example, by blowing or vacuuming, machining, sanding or media blasting. Further, conventional post processing may involve removal of the part 122 from the build platform/substrate through machining, for example. Other post processing procedures include a stress release process. Additionally, thermal and chemical post processing procedures can be used to finish the part 122.

The abovementioned AM processes is controlled by a computer executing a control program. For example, the apparatus 110 includes a processor (e.g., a microprocessor) executing firmware, an operating system, or other software that provides an interface between the apparatus 110 and an operator. The computer receives, as input, a three dimensional model of the object to be formed. For example, the three dimensional model is generated using a computer aided design (CAD) program. The computer analyzes the model and proposes a tool path for each object within the model. The operator may define or adjust various parameters of the scan pattern such as power, speed, and spacing, but generally does not program the tool path directly. One having ordinary skill in the art would fully appreciate the abovementioned control program may be applicable to any of the abovementioned AM processes. Further, the abovementioned computer control may be applicable to any subtractive manufacturing or any pre or post processing techniques employed in any post processing or hybrid process.

The above additive manufacturing techniques may be used to form a component from stainless steel, aluminum, titanium, Inconel 625, Inconel 718, Inconel 188, cobalt chrome, among other metal materials or any alloy. For example, the above alloys may include materials with trade names, Haynes 188®, Haynes 625®, Super Alloy Inconel 625™, Chronin® 625, Altemp® 625, Nickelvac® 625, Nicrofer® 6020, Inconel 188, and any other material having material properties attractive for the formation of components using the abovementioned techniques.

In the abovementioned example, a laser and/or energy source is generally controlled to form a series of solidification lines (hereinafter interchangeably referred to as hatch lines, solidification lines and raster lines) in a layer of powder based on a pattern. A pattern may be selected to decrease build time, to improve or control the material properties of the solidified material, to reduce stresses in the completed material, and/or to reduce wear on the laser, and/or galvanometer scanner and/or electron-beam. Various scanning strategies have been contemplated in the past, and include, for example, chessboard patters and/or stripe patterns.

One attempt at controlling the stresses within the material of the built AM component involves the rotation of stripe regions containing a plurality of adjoining parallel vectors, as solidification lines, that run perpendicular to solidification lines forming the boundaries of the stripe region. for each layer during an AM build process. Parallel solidification lines, bounded by and perpendicular to a stripe, are rotated for each layer of the AM build. One example of controlling the scanning strategy in an AM apparatus is disclosed in U.S. Pat. No. 8,034,279 B2.

FIGS. 2 and 3 represent the abovementioned rotating stripe strategy. The laser is scanned across the surface of a powder to form a series of solidification lines 213A, 213B. The series of solidification lines form a layer of the build and are bound by solidification lines in the form of stripes 211A, 212A and 211B, 212B that are perpendicular to the solidification lines 213A and 213B forming the boundaries of each stripe region. The stripe regions bounded by solidification lines 211A and 212A form a portion of a larger surface of the layer to be built. In forming a part, a bulk of the part cross section is divided into numerous stripe regions (regions between two solidified stripes containing transverse solidification lines). A stripe orientation is rotated for each layer formed during the AM build process as shown in FIGS. 2 and 3. A first layer may be formed with a series of parallel solidification lines 213A, in a stripe region, formed substantially perpendicular to and bounded by solidified stripes 211A. In a subsequent layer formed over the first layer, the stripes 211B are rotated as shown in FIG. 3. By creating a stripe boundary for the solidified lines 213A and 213B through a set of solidified stripes 211B and 212B that are rotated with respect to the previous layer, solidification lines 213B, which are be formed perpendicular to and are bounded by stripes 211B are also be rotated with respect the solidification lines 213A of the previous layer.

As shown in FIGS. 4 and 5, a built AM component includes a plurality of layers 215, 216, 217. When built using the abovementioned strategy, a first layer 217 may be divided by software into several stripe regions bounded by, stripes 257 and 277 formed as solidification lines. The stripes 257 and 277 may form a boundary for individually formed parallel adjoining vectors or solidification lines 267. The surface of the part includes a plurality of stripes covering the surface to be built. As shown in FIG. 5, each stripe region is bounded by solidified stripes 257 and 277 in layer 217 form a boundary for a series of parallel solidified lines 267. The parallel solidification lines 267 are perpendicular to the solidified stripe boundaries 257 and 277. The stripes are oriented at a first angle in layer 217 with the perpendicular solidification lines 267 being formed substantially perpendicular to the stripes 257 and 277. The stripe region bound by solidified stripes 256 and 257 on a second layer 216 are angled with respect to the solidified stripe boundaries 257 and 277 on previous layer 217. Accordingly, solidification lines 266 that run perpendicular to solidified stripes 256 and 276 are also be angled with respect to the solidification lines 267 on previous layer 217. As the build progresses, a next layer having stripes 265 and 275 on a third layer 215 are angled with respect to stripes 257 and 277 on layer 217; and stripes 256 and 276 on layer 216.

Even with the abovementioned rotating stripe strategy, the need exists to further create variance in each layer. By employing the various embodiments disclosed, build efficiency can be further increased by preventing unnecessary jumps of the energy source, preventing unnecessary on/off transitions of the laser and/or improving control and/or efficiency of heat buildup within the layer. Further the microstructure of the part can be altered by controlling the pattern of stripe regions and solidification lines within the stripe region.

SUMMARY OF THE INVENTION

One challenge associated with laser based AM is producing a desired melt pattern in the powder while maintaining a desired speed of the build process. Slowing of the build process and/or inaccuracies in the melt pattern result, for example, when a laser is turned on and/or off too early or late at the beginning and/or end of a hatch line. Turning a laser on too early may result in a burn-in effect where the melt pool is longer than the desired length of the hatch. Further, the buildup of heat within the powder and fused material during a build is a concern, as various material defects may occur if too much heat is built up in the material during an AM process and/or if insufficient heat is built up to properly fuse the powder.

The disclosure relates to an improved scanning strategy, having a hatch pattern for scanning a laser during an AM build process. When controlling the laser during the build process according to one embodiment, an alternating hatch pattern is used to form solidification lines on each layer so as to improve the microstructure of the completed component. In one aspect, a first layer is formed by scanning a laser across the surface of the powder to form at least partially melted solidification lines, wherein each line is scanned and formed as a solidification line forming two angled segments of a triangle. In other words, a solidification line is formed along a first liner path and a second linear path and the first and second linear paths are angled with respect to one another. The first and second linear paths of the laser scan and subsequently formed solidification lines may be contained within a stripe region forming a portion of the component being built. Once the series of solidification lines are formed on the layer, a subsequent layer of powder is added on top of the previously solidified scan lines; and a second series of solidification lines are formed as a first linear path and a second linear path, wherein the first linear path is angled with relation to the second liner path. Further, the abovementioned angle formed between the first linear path and second linear path may be varied for each subsequent layer; so that no subsequent layer has the same angle between the first linear path and the second linear path, thereby improving build efficiency and/or the balance of stresses imparted in the finished solidified component formed using the AM process.

By dividing up areas of the surface to be scanned as described below, further variance between layers can be achieved during an AM build allowing for increased control of the microstructure of the completed component. Build efficiency can also be further increased by preventing unnecessary jumps of the energy source, preventing unnecessary on/off transitions of the laser and/or by improving control and/or efficiency of heat buildup within the layer being formed and/or the layers of the build. In the case of multiple lasers and/or energy sources being used, the disclosed scanning scheme may be used to further improve the AM build by employing various strategies for the use of multiple energy sources (e.g. lasers and/or electron-beams).

When forming a series of the abovementioned first solidification line and second solidification lines. The possibility of a high energy density region may occur near the end of a stripe or near the end of contour of the component, in order to balance the heat distribution throughout the layer, a third series of solidification lines may be formed that are substantially parallel to a first series of solidification lines and intersect one of the second solidification lines. By forming the third series of solidification lines, the distance over which the energy source is scanned is increased, thus preventing a high concentration of heat within a certain region of the component being built. By dividing up areas of the surface to be scanned as described below, further variance between layers can be achieved during an AM build allowing for increased control of the microstructure of the completed component. Build efficiency can also be further increased by preventing unnecessary jumps of the energy source, preventing unnecessary on/off transitions of the laser and/or by improving control and/or efficiency of heat buildup within the layers of the build. In the case of multiple lasers and/or energy sources being used, the disclosed scanning scheme may be used to further improve the AM build by employing various strategies for the use of multiple energy sources (e.g. lasers and/or electron-beams).

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 1 is a side view and top view diagram of a conventional additive manufacturing technique used to form at least part of a component;

FIG. 2 is a top view depicting a conventional hatch and stripe pattern used to form at least a part of a component;

FIG. 3 is a top view depicting a conventional hatch and stripe pattern used to form at least a part of a component;

FIG. 4 is a perspective view, depicting example layers of component build during a conventional AM process;

FIG. 5 is a top view of the individual layers shown in FIG. 4, depicting a conventional hatch and stripe pattern used to form at least a part of a component;

FIG. 6 is a top view depicting a hatch and stripe pattern used to form at least a part of a component in accordance with one aspect of the disclosure;

FIG. 7 is a top view depicting a hatch and stripe pattern used to form at last a portion of a component in accordance with one aspect of the disclosure;

DETAILED DESCRIPTION

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

When using any of the abovementioned AM techniques to form a part by at least partially melting a powder, a scan of the laser across the powder material, in a raster scan fashion is used to create hatch scans (hereinafter referred to interchangeably as hatch scans, rasters, scan lines, or solidification lines). During an AM build, the abovementioned solidification lines are used to form the bulk of a part cross section. Contour scans, may further be used to outline the edges of the part cross section. During a raster scan process, the energy source or laser is turned on, increased in power and/or focused in regions where a solid portion of the AM build is desired, and switched off, defocused, and/or decreased in power where melt formation of the object's cross section in that layer are not desired. During a raster scan process, at least partially melting of powder and formation of solidification is repeated along adjacent solidification lines, for example, to form a single melted and fused cross section of the object to be built, while the contour scans create a discrete border or edge of the part. In the example AM apparatus using a powder bed, once the melt formation of one cross section of the object being built is completed, the apparatus coats the completed cross-sectional surface with an additional layer of powder. The process is repeated until the object is complete.

In the aforementioned and subsequent embodiments, the laser and/or energy source is controlled to form a series of solidification lines in a layer of powder using a pattern for at least the following reasons; to decrease build time, to control the heat buildup within the powder and/or to increase the efficiency of the build, to improve and/or control the material properties of the solidified material, to reduce stresses in the completed material, and/or to reduce wear on the laser and/or galvanometer scanner.

Figure 10:
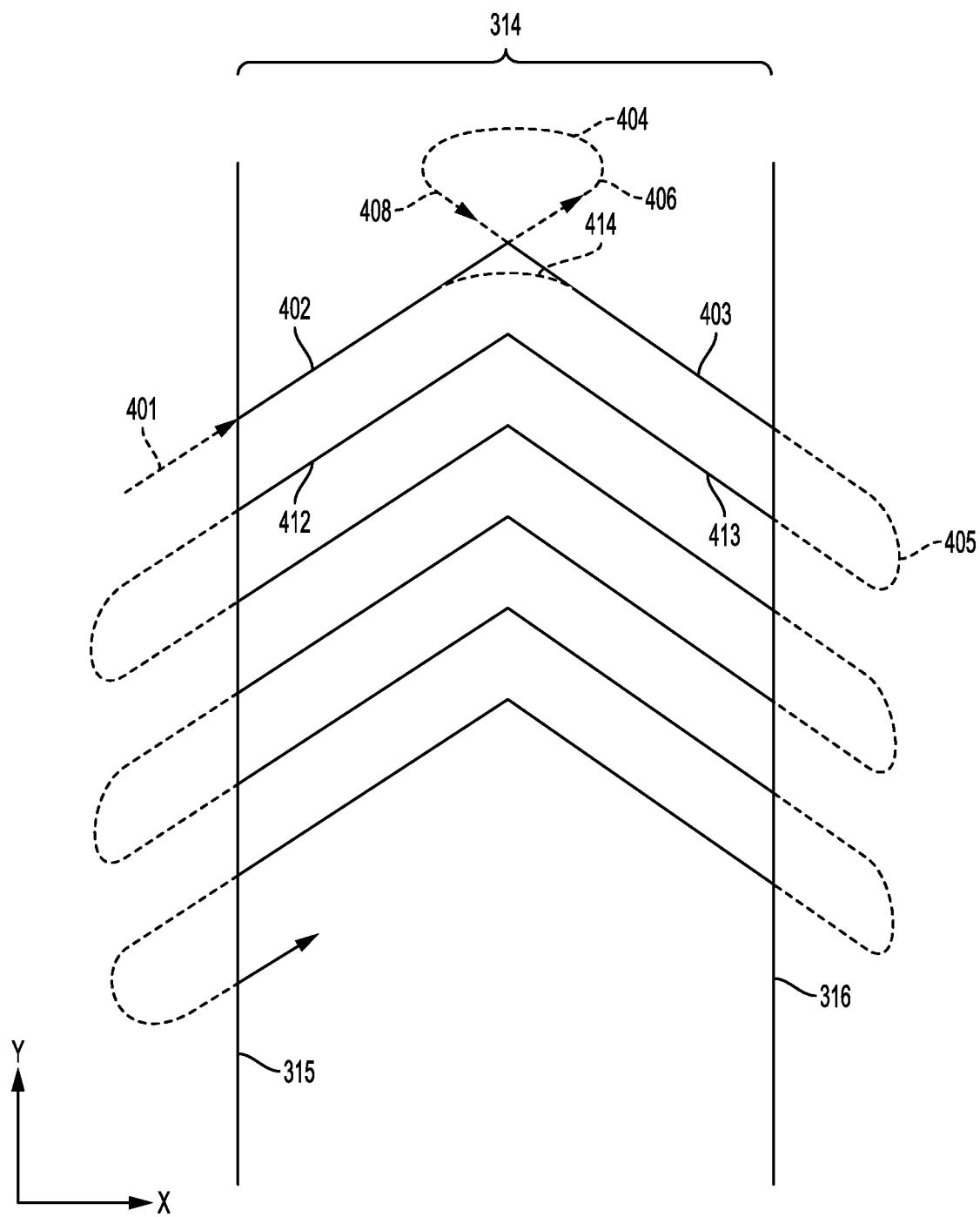
FIG. 10 is a top view depicting a hatch and stripe pattern and an example path of the energy source in accordance with one aspect of the disclosure.

FIGS. 6 and 7, represent the scan pattern of one embodiment, wherein a laser is used to form an angled scan pattern forming solidification lines (e.g. 311 and 312) within a stripe region bounded one or more stripes 308 and/or 309. One of or both of the stripes 308 and/or 309 may either be an imaginary boundary and/or may be formed as a solidification line. For example as shown in FIG. 10, the laser or a plurality of lasers may be focused, increased in power and/or turned on while within the stripe region having width 314 and having imaginary and/or real boundaries 315 and/or 316; accordingly, while a specific stripe region is being formed, solidification lines are only formed within a stripe region bounded by stripe boundaries 315 and 316. When the path of the laser or plurality of lasers are scanned outside of the boundaries of the stripe region (e.g. portions 401 and 405) the irradiation source is turned off, defocused and/or decreased in power so that melting and solidification of the powder does not occur. As an alternative, the stripe boundaries 315 and/or 316 may also be at least partially melted and solidified by a laser or irradiation source and formed as solidification lines either before, after, or during a scan and solidification process within the stripe region.

FIGS. 6 and 7 represent the angled solidification lines which may be formed within each stripe region in accordance with one aspect of the disclosure. The solidification line pattern may be selected to control and/or improve the stresses and microstructure within the material during a build process and/or to improve efficiency of the build process. The pattern shown in FIGS. 6-10 is one example of at least partially melted and subsequently solidified powder that has been fused using an irradiation source to form solidification lines. The scan pattern may be contained within a stripe region bounded by a first stripe boundary 308 and may further be bounded by a second stripe boundary 309 that is substantially parallel to the first stripe boundary 308 and located a distance 310 from the first stripe. It is noted that the disclosed pattern, or any of the patterns described below, may also cover a portion and/or entire span of the cross-section of the layer of the part being formed and each layer may be formed by forming the pattern within stripe regions, over a span of the entire surface, or any combination of the two. By forming an angled scan pattern, an increase in the variance between layers can be achieved over the abovementioned rotating stripe scheme resulting in a build process that is more efficient and allowing further tailoring of the microstructure and material properties of the completed component.

In one embodiment, for each layer formed during the AM build process, a first portion of a first layer is formed with solidification lines 311A formed at an a angle other that 90° with relation to the boundary 308 of the stripe region; the solidification lines 311 may be contained or bounded by two or more stripe boundaries (which may hereinafter be interchangeably referred to as a stripe and/or boundary stripe). The stripes may have a stripe boundary spacing 310. The solidification lines 311 of each layer includes a series of first parallel solidification lines 311A beginning at and/or ending at stripe boundary 308 and a second set of solidification lines 311B beginning and/or ending at the opposite stripe boundary 309 of the stripe region. Accordingly, when forming the solidification lines, the laser and/or energy source scanning vector changes directions (e.g. from 311A, and then forms a second solidification line 311B, wherein the second solidification line 311B is angled $\theta_{A1}$ with respect to first solidification line 311A). In other words, the first series of solidification lines 311A form an incident angle, represented by $\theta_{A1}$ with respect to the second series of solidification lines 311B.

In a subsequent layer formed over the first layer, an example of which is shown in FIG. 7, at least a first portion of a second layer is formed with solidification lines 312 formed within a stripe region having width 314 at an a angle other that 90° with relation to, and bounded by at least one boundary 315 and/or 316. The stripe region spacing 314 having at least two stripe boundaries 315 and/or 316 may be the same as or different from the stripe spacing 310 of a previous layer or a subsequent layer (not shown). Further, the solidification lines 312 of the layer may include a series of third parallel solidification lines 312A beginning at and/or ending at the stripe region boundary 316. When forming the raster scan in the exemplary layer shown in FIG. 7, the laser and/or energy source may change directions and form a fourth series of solidification lines 312B, wherein the fourth series of solidification lines 312B are angled with respect to the third series of solidification lines 312A. The third series of solidification lines 312A are formed at an incident angle $\theta_{A2}$ with respect to the fourth series of scan vectors 312B. Angles $\theta_{A1}$ and/or $\theta_{A2}$ may be varied so that no subsequent or previous layer has an angle that is the same. Further, in one aspect the difference between $\theta_{A1}$ and $\theta_{A2}$ may be 10° or greater.

Figure 8:
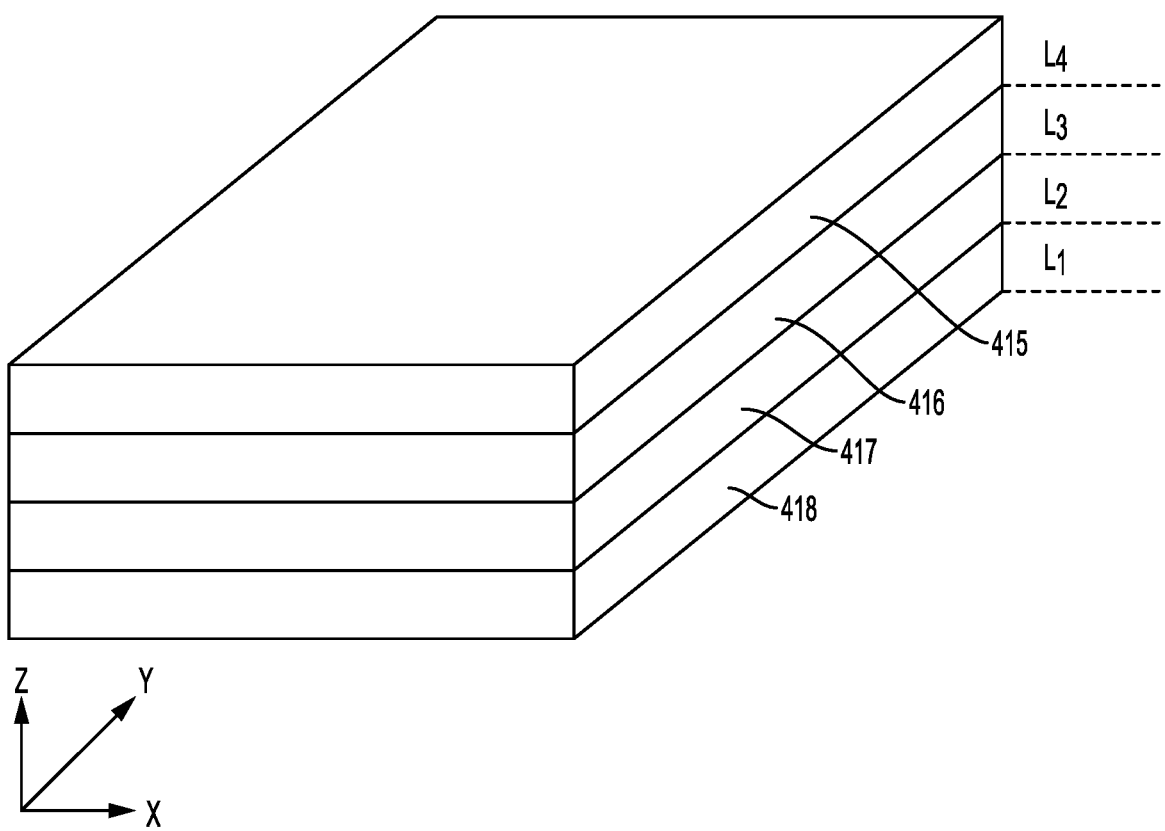
FIG. 8 is a perspective view, depicting example layers of component build during an AM process in accordance with one aspect of the disclosure.
Figure 9:
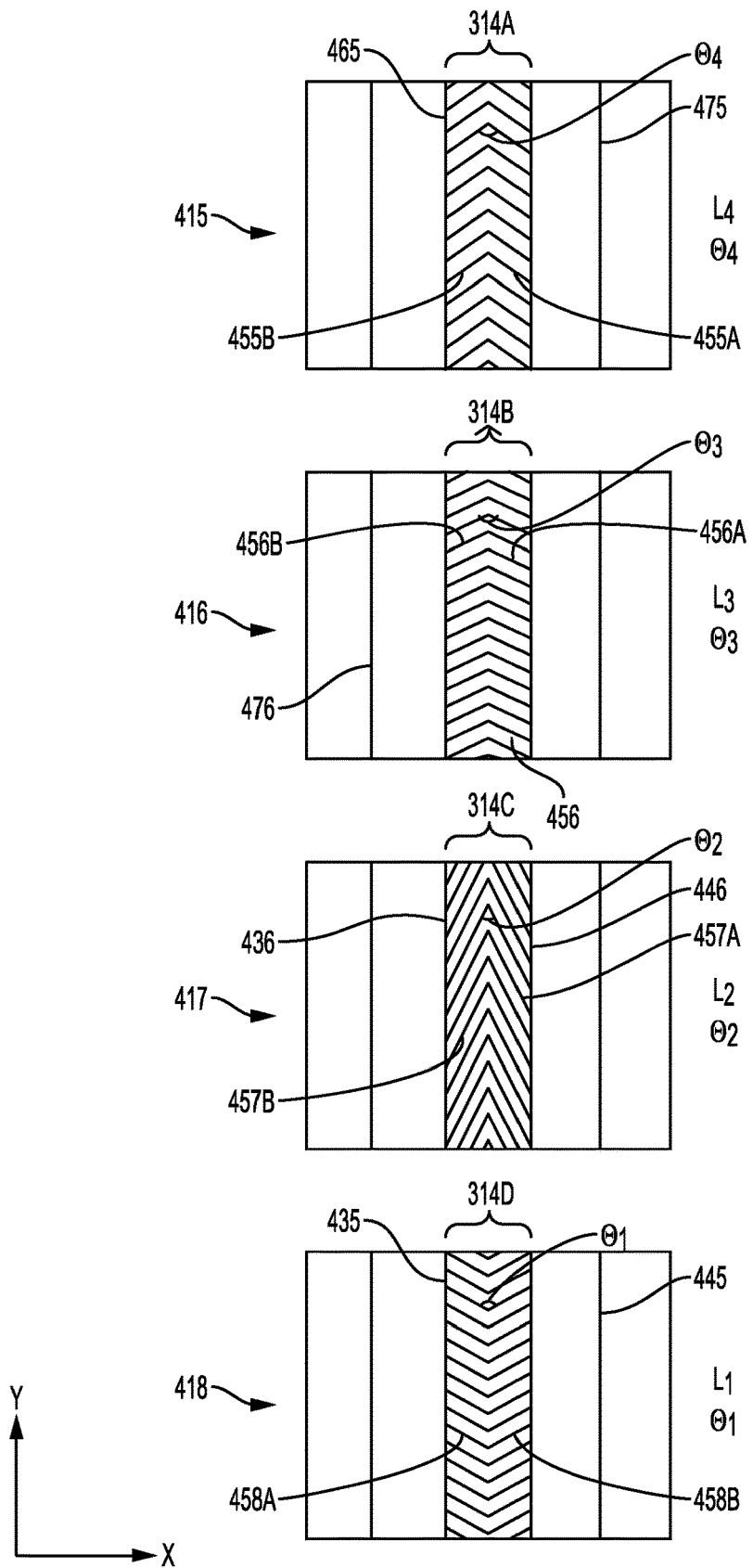
FIG. 9 is a top view of the individual layers shown in FIG. 8, depicting a hatch and stripe pattern used to form at least a part of a component in accordance with one aspect of the disclosure.

FIGS. 8-10, represent an AM component comprising built by the solidification of a plurality of layers 415, 416, 417, and 418 in accordance with one embodiment. When built using any of the abovementioned AM processes, a first layer 418 may be divided by the abovementioned software into several stripe regions bounded by stripe boundaries. For example, stripe boundaries 465, 475, and 476 may form at least one boundary for transversely formed solidification lines. The stripe boundaries 465 and 475 may form a boundary for individually formed solidification lines 455. As an example, each solidification line is formed by at least partially melting portions 402 and 403 as a first substantially linear solidification line and a second substantially linear solidification line respectively. Solidification lines 402 and 403 may be in close proximity to the next set of formed solidification lines 412 and 413. In at least one embodiment, if the laser and/or energy source melts the powder corresponding to each of portions 402, 403, 412, and 414 in succession, the portions 402, 403, 412, and 414 may fuse together. For example, when forming portions 402, 403, 412, and 414 a laser and/or energy source may adjusted to control the amount of powder melted along a solidification line; accordingly, a melting width and depth of each solidification line may be controlled. When the laser melts powder corresponding to solidification line 412, the material in the portion 402 may not have cooled and the thin line of powder between the portion 402 and the portion 412 may at least partially melt. The molten material in a solidification line 402 may fuse with the molten material in solidification line 412 and the molten material in solidification line 413 may fuse with the molten material in solidification line 403. The energy source and/or laser may also be controlled so that the heat radiating from the solidification line 402, and solidification line 412 may cause the thin line of powder between solidification lines 402 and/or 403 and solidification lines 412 and/or 413 to sinter together without melting. Further, the scanning of the energy source and/or laser to form, for example, solidification line 402 and solidification line 412 may cause the thin line of powder between the solidification lines 402 and/or 403 and solidification lines 412 and/or 413 to remain unfused without sintering and/or melting.

When forming the individual solidification lines 402, 403, 412, and 413, in an example embodiment using a laser as the energy source, a galvanometer scanner may guide the laser over a path starting at 401, and continue subsequently to portions 402, 406, 404, 408, 403, 405, 413 and 412. As shown in FIG. 10, the energy source may be turned off, decreased in power, and/or defocused (hereinafter interchangeably referred to as skywriting and/or skywritten) over the path 408, 404, 406, the. It is noted that while FIG. 10 shows path 408, 404, 406 between solidification lines 402 and 403, a similar path may be followed by the energy source guiding portion for each subsequent series of solidification lines (e.g. 413 and 413, for example). As an alternative, the galvanometer scanner or other energy source guiding mechanism may also guide the energy source (e.g. laser) over a path starting at 401 and continue subsequently to portions 402, 414, 403, 405, 413 and 412, in this alternative, the energy source may form a solidification line 402 and continuously form a curved solidification portion 414 and solidification line 403. It is noted that while FIG. 10 shows the alternative curved solidification path 414 between solidification lines 402 and 403, a curved solidification path, such as shown in reference 414 may be followed by the energy source guiding portion for each subsequent series of solidification lines (e.g., 413 and 413, for example) thereby connecting each of the solidification lines with a curved solidification path instead of forming a point (e.g. the intersection between solidification lines 402 and 403) at the intersection of each set of solidification lines. As yet another alternative, solidifications lines 402 and 403 may be formed continuously without the energy source being turned off, defocused and/or decreased in power. Forming solidification lines 402 and 403 continuously, without any skywriting (e.g. 406, 404, and 408) or without forming a curved solidification portion (e.g. 414) between the two solidification lines may be most advantageous when the incident angle between the each solidification line (e.g. 402 and 403 or 413 and 412 is sufficiently large. In one example, a set of solidification lines (e.g. 402 and 403) are formed continuously, without skywriting (e.g. 408, 404, and 406) or forming a curved solidification portion (e.g. 414) between the two solidification lines when the incident angle between the subsequent solidification lines is greater than 120°. Further, the two segments may be formed continuously, without skywriting or forming a curved solidification portion (e.g. 414) between the two solidification lines, when the incident angle between the two subsequent solidification lines is greater than 150°. When forming the abovementioned portions, the laser is also turned off, defocused and/or decreased in power such that skywriting occurs in portions 401 and 405, so when forming solidification lines within the stripe region bounded by stripe boundaries 315 and/or 316, the laser and/or energy source only supplies enough energy to the powder to at least partially melt the powder within the stripe region. It is noted the abovementioned scan pattern is not limited to one energy and/or laser source, and may be performed by a plurality of energy and/or laser sources. For example, a first laser may form solidification lines 402 and 403, and a second laser may form solidification lines 412 and 413. Further, it is noted that each of the abovementioned alternative paths (e.g. skywrite 404, curved solidification path 414 and/or continuously formed solidification lines without a curved solidification path or skywrite between two sets of angled solidification lines) may be formed either consistently throughout the stripe, layer and/or the build, or the abovementioned paths may be used in any combination either within a stripe, within a build layer, and/or throughout the build.

FIGS. 8 and 9, represent the process of building a component using an AM technique in accordance with one embodiment. At least a portion of a component built using an AM technique, an example of which is shown in FIG. 8, comprises a plurality of at least partially fused layers 415, 416, 417, and 418. A first layer 418 may be divided by the abovementioned software into several stripe regions bounded by, for example, stripe boundaries 435, 436, 445, 446, 465, 475, and 476. The stripe regions in layer 418, having a width 314D, form a boundary for series of individual scan portions formed as solidification lines 458A and 458B, for example. Each solidification line is formed at an a angle other that 90° with relation to stripe boundaries 435 and 445 and is contained within the stripe region. A first solidification line 458A formed on layer 418 may be substantially linear and may form an incident angle $\theta_1$ with respect a second substantially linear solidification line 458B. As shown in FIG. 10 the energy source and/or laser path may follow a first linear path to form solidification line 458A and may change direction to a second linear path to form a second portion of the solidification line 458B such that the laser forms portions 458A and 458B along the surface of the powder. Further, while the exemplary figures show solidification lines 458A and 458B forming an angle having a point, the abovementioned raster scans may form an angle having a filleted or curved transition (e.g. as shown in FIG. 10 reference 414) between solidification lines 458A and 458B, for example. The stripe region having a width 314D may further be filled in with a plurality of solidification lines parallel to, for example, portions 458A and 458B (e.g. as shown in FIG. 10).

In a next layer 417 of the AM build, a subsequent layer of powder is distributed over the surface of layer 418. Based on the desired geometry of the AM part being built, layer 417 may be divided into a series of stripe regions having a stripe width 314C. The stripe width 314C may be the same as or different from stripe width 314D of the previous layer. Layer 417 may include a series of solidification lines 457A and 457B which are contained in each stripe region. Each stripe region may be filled with repeating solidification lines 457A and 457B which are formed at an a angle other that 90° with relation to, and bounded by stripe boundaries 436 and 446. For example, one specific solidification line 457A may be substantially linear and may form an angle $\theta_2$ with respect to a continuously formed substantially linear solidification line 457B. Angle $\theta_2$ of layer 417 may be different from angle $\theta_1$ of layer 418, and may be varied by 10° or greater from $\theta_1$ of layer 418 or any of the previous or the immediately subsequent layers. The energy source and/or laser path may form the solidification line 457A and change direction to form a second portion of the solidification line 457B; the laser may form portions 457A and 457B continuously as shown in the example shown in FIG. 10. The stripe region having a width 314C may further be filled in with a plurality of solidification lines parallel to, for example, portions 457A and 457B (e.g. as shown in FIG. 10).

Subsequent layers of the AM build may be formed using the abovementioned methods. For example, layers 416 and 417 may be divided up into stripe regions based on the desired geometry of the AM build. As stated above, the energy source and/or laser may form a solidification lines having angles θ3 and 04, which may be varied for each subsequent layer. Further, the angle with respect to each stripe boundary (e.g. 465, 475 and 476) may be varied for each additional layer. And the stripe width 314B and 314A may be the same or different for each subsequent layer. As mentioned above, the angles between a first solidification line and a second solidification line $\theta_3$ in layer 416 and $\theta_4$ in layer 415 may vary by 10° or more for each subsequent layer.

Figure 11:
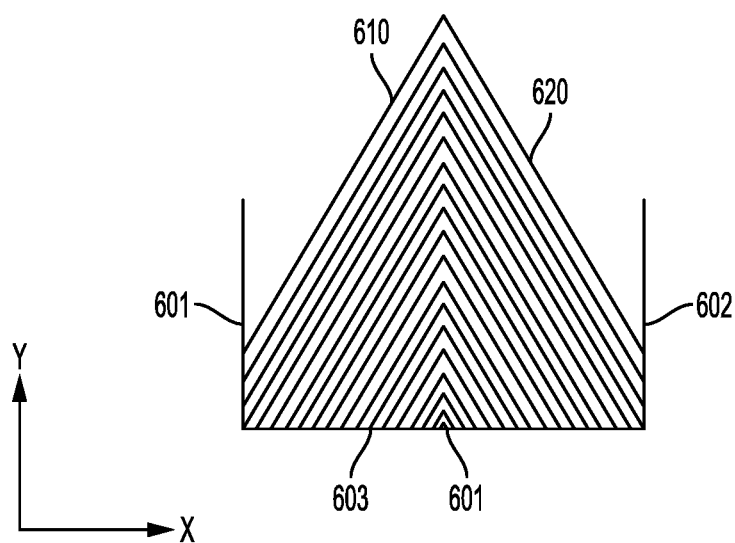
FIG. 11 is a top view depicting a hatch and stripe pattern used to form at least a part of a component in accordance with one aspect of the disclosure.
Figure 12:
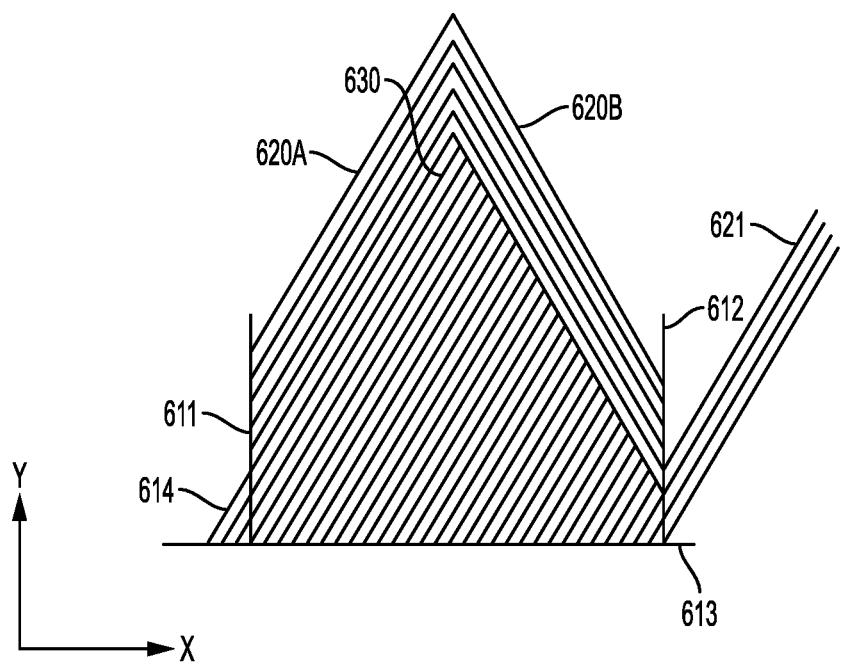
FIG. 12 is a top view depicting a hatch and stripe pattern used to form at least a part of a component in accordance with one aspect of the disclosure.

Further, it is understood that the angle with respect to the stripe boundary for each layer (and the stripe width) may be varied for each layer so that the angle of the solidification lines is varied for each layer and the angle θ between first and second portion of each solidification line may be kept constant. It is also noted that the number of angles and solidification lines bounded by each stripe is not limited to one angle and two portions of a solidification line, and may include a solidification line having three or more portions all angled with relation to one another. It may further be desirable to keep the stripe width, angle θ, and the raster hatch pattern constant between at least two subsequent layers, so that the solidification lines are kept parallel between two or more layers. It is further noted that any combination of the abovementioned features and methods may be used together in an alternative scheme for building the component FIGS. 11 and 12 represent a top view of a scanning and solidification pattern according to another embodiment employing the abovementioned strategies and a leg elimination strategy respectively. In certain portions of an AM build, depending on at least a geometry of the layer being built. It may be desirable to control the heat buildup within the powder and/or in the solidification lines formed on the layer of powder. As shown in FIG. 11, when the forming a series of solidification lines (eg. 610 and 620) within a stripe region bounded by stripe boundaries 601 and 602, solidification lines which may be formed within each stripe region in accordance with one aspect of the disclosure. The solidification line pattern may be selected to control and/or improve the stresses and microstructure within the material during a build process and/or to improve efficiency of the build process. The pattern shown in FIG. 11 is one example of at least partially melted and subsequently solidified powder that has been fused using the laser to form solidification lines. The scan pattern may be contained within a stripe region bounded by a set of boundary stripes 601 and 602. Further, the stripe region may be bounded by a contour scan, the end of the component to be built and/or a stripe boundary 603 (which will be referred to throughout the disclosure as a stripe boundary). When filling in the stripe region with solidification lines having first portions 610 and second portions 620 angle with relation to one another a high energy density portion 601 may be formed due to the shorter spans of the solidification lines near a stripe boundary 603. It may be advantageous for even out the heat distribution within the build by employing a leg elimination strategy, an example of which is shown in FIG. 12.

As shown in FIG. 12, at least a portion of a layer being at least partially melted during an AM build process may include a stripe region bounded by stripe boundaries 611 and 612. The region may further be bounded by stripe 613. A first portion of a first layer is formed with solidification lines 620A formed at an angle other that 90° with relation to the boundary 611 of the stripe region; the solidification lines 610A may by contained or bounded by two or more stripe boundaries 611, 612, and 613. The solidification lines 620 of each layer includes a series of first parallel solidification lines 620A beginning at and/or ending at stripe boundary 611 and a second set of solidification lines 620B beginning and/or ending at the opposite stripe boundary 612 of the stripe region. Accordingly, when forming the solidification lines, the laser and/or energy source scanning vector changes directions while forming solidification line 620A, changes direction, and forms a second solidification line 620B, wherein the second solidification line 620B is angled with respect to the first solidification line 620A. In other words, the first series of solidification lines 620A form an angle with respect to the second series of solidification lines 620B. Whenever desired and/or when it is determined that a high energy density portion of the build may occur, scanning of the laser and subsequent solidification lines may be altered to form a third series of solidification lines 630, which are bounded and intersect one of the second series of solidification line 620B at a point (e.g. intersection 792 in FIG. 15), for example. Further, when the third series of solidification lines 630 are no longer bounded by the second solidification lines 620B, the third series of solidification lines may be continuously formed into an adjoining stripe region (e.g. portion 613 formed beyond stripe boundary 612). The third series of solidification lines 614 may also continue past boundary stripe 611 until boundary stripe 613 is reached.

Figure 13:
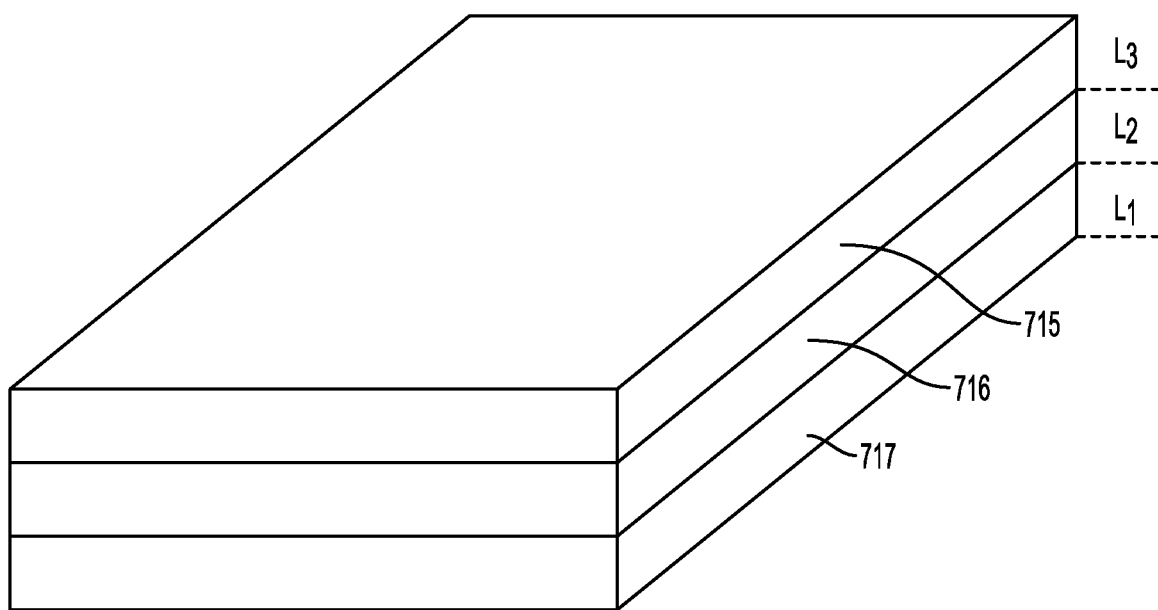
FIG. 13 is a perspective view, depicting example layers of component build during an AM process in accordance with one aspect of the disclosure.
Figure 14:
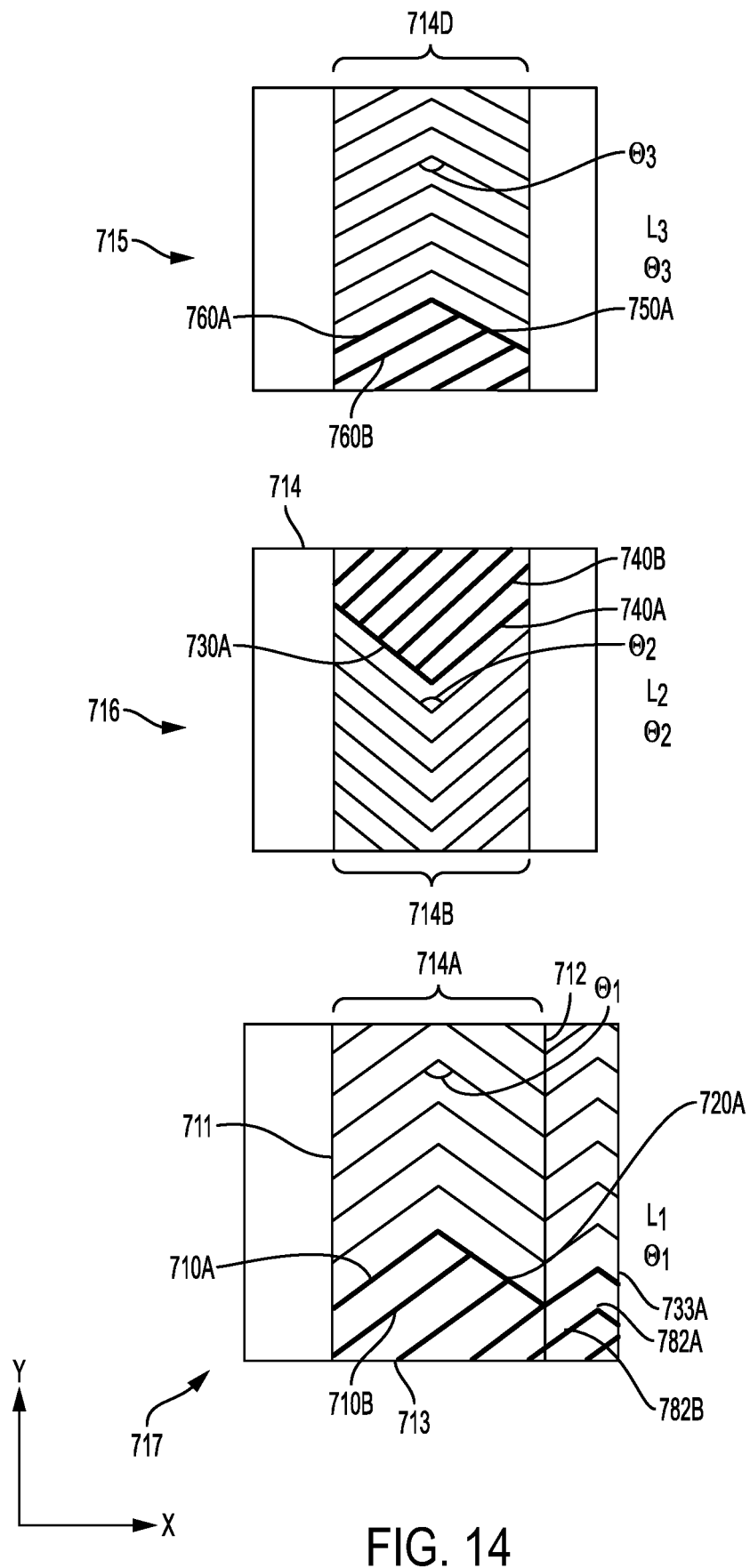
FIG. 14 is a top view of the individual layers shown in FIG. 13, depicting a conventional hatch and stripe pattern used to form at least a part of a component in accordance with one aspect of the disclosure.

FIGS. 13 and 14, represent several examples of the process of building a component using an AM technique in accordance with the abovementioned embodiment. At least a portion of a component built using an AM technique, an example of which is shown in FIG. 13, comprises a plurality of at least partially fused layers 717, 716, and 715. A first layer 717 may be divided by the abovementioned software into several stripe regions bounded by, for example, stripe boundaries 711 and 712. The stripe regions in layer 717, having a width 714A, form a boundary for series of individual scan portions formed as solidification lines 710A and 720A, for example. Solidification lines 710A and 720A are formed at an a angle other that 90° with relation to stripe boundaries 711 and 712 and are contained within the stripe region. A first solidification line 710A formed on layer 717 may be substantially linear and may form an angle $\theta_1$ with respect a second substantially linear solidification line 720A. For example, the laser path may follow a pattern as shown in FIG. 10; specifically, the energy source and/or laser path may follow a first linear path to form solidification line 710A and may change direction to a second linear path to form a second portion of the solidification line 720A such that the laser forms portions 710A and 720A along the surface of the powder. However, when the laser scanning path is proximal to a portion a third boundary 713 (e.g. a contour scan, the end of the component to be built and/or a stripe boundary), a third solidification line 710B is formed. The third solidification line 710B may be substantially parallel with a solidification line 710A, however solidification line 710 is formed using a substantially linear laser path that does not change direction while at least partially melting the powder. In other words, solidification line 710B is formed from a first stripe boundary 711 to a second solidification line 720A without changing direction.

Further, if a subsequent solidification line of the parallel series of solidification lines 710B is formed in a portion of the build where the laser path does not intersect a second solidification line 720A, the laser path may continue past stripe boundaries 711 and 712 and the build may begin in the next stripe region. For example, the solidification lines 710B on layer 717 are bounded by 720A, when the path at which solidification lines 710B are formed no longer intersect 720A, the solidification lines 710B continue past stripe boundary 712 and form solidification line portion 782B in a bordering stripe region. The laser path forming solidification line 782A then changes direction and forms a solidification line 783A which is angled with respect to solidification line 782A. The build in the next stripe region can then continue using any combination of the above series of angled solidification lines and/or linear leg elimination solidification lines.

In a next layer 716 of the AM build, a subsequent layer of powder is distributed over the surface of layer 717. Based on the desired geometry of the AM part being built, layer 717 may be divided into a series of stripe regions having a stripe width 414B. The stripe width 414B may be the same as or different from stripe width 414A of the previous layer. Layer 417 may include a series of solidification lines 730A and 740A which are contained in each stripe region. Each stripe region may be filled with repeating solidification lines 730A and 740A which are formed at an angle other that 90° with relation to, and bounded by stripe boundaries of a stripe region having width 714B. For example, one specific solidification line 740A may be substantially linear and may form an angle $\theta_2$ with respect to a continuously formed substantially linear solidification line 730A. Angle $\theta_2$ of layer 716 may be different from angle $\theta_1$ of layer 717, and may be varied by 10° or greater from $\theta_1$ of layer 717 or any of the previous or the immediately subsequent layers. Similarly to the method above, the energy source and/or laser path may form the solidification line 740A and change direction to form a second portion of the solidification line 730A and the stripe region having a width 714B may be filled in with a plurality of solidification lines parallel to, for example, portions 730A and 740A. However, when the laser scanning path is proximal to a portion a third boundary 714 (e.g. a contour scan, the end of the component to be built and/or a stripe boundary), a third solidification line 740B is formed. The third solidification line 740B may be substantially parallel with a solidification line 740A, however solidification line 740B is formed using a substantially linear laser path that does not change direction while at least partially melting the powder. In other words, solidification line 740B is formed from a stripe boundary to a solidification line 730A without changing direction. It is noted that the leg elimination strategy may be employed in a single stripe region and/or over a single layer of the build and/or over the entire build depending on the desired characteristics of the part. Any combination of the abovementioned and below discussed strategies may be employed in combination throughout the build process (e.g., one stripe may employ a subsequent stripe may use the abovementioned triangle hatch strategy).

Figure 15:
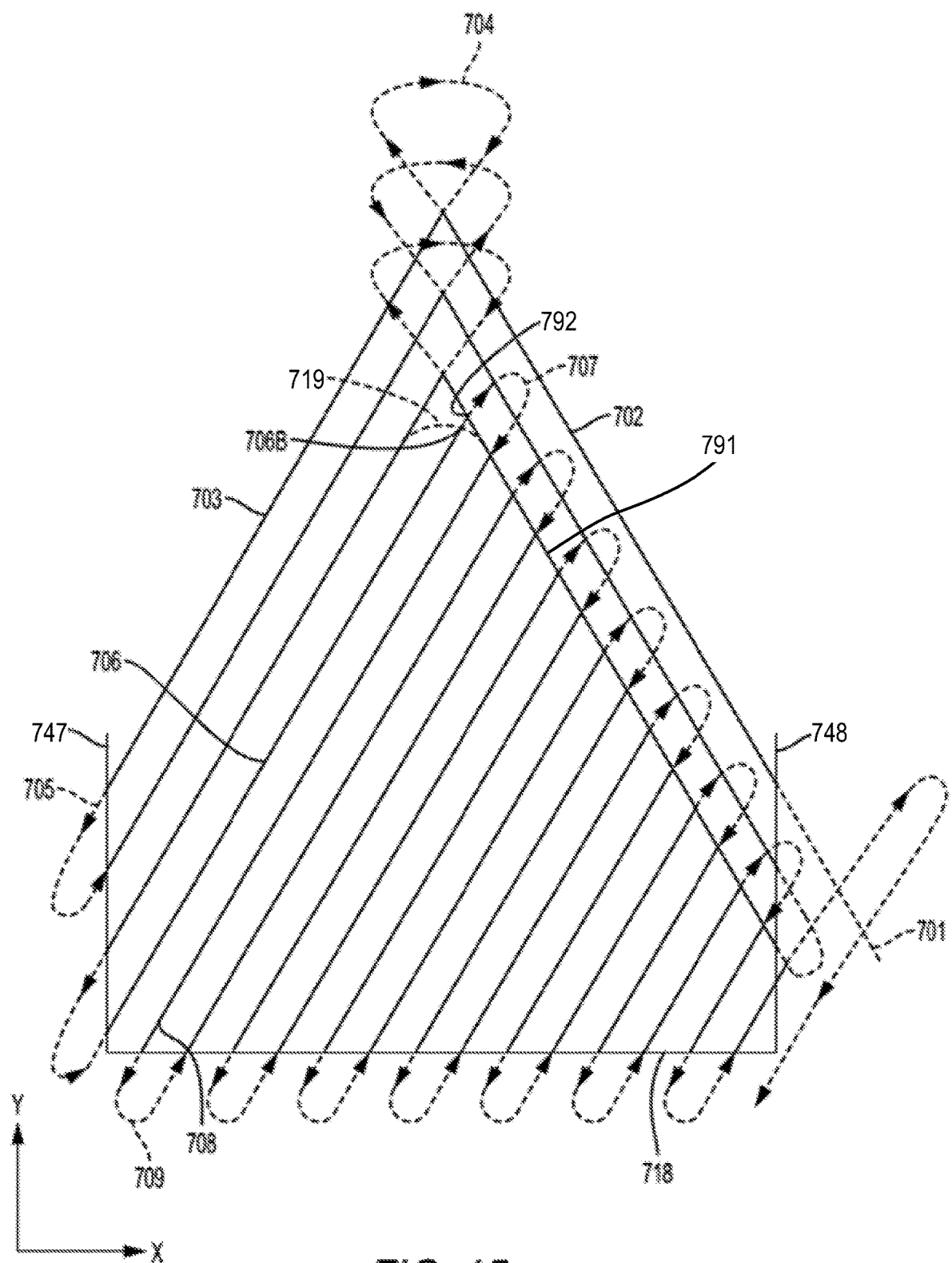
FIG. 15 is a top view depicting an example leg elimination hatch and stripe pattern and an example path of the energy source in accordance with one aspect of the disclosure.
Figure 16:
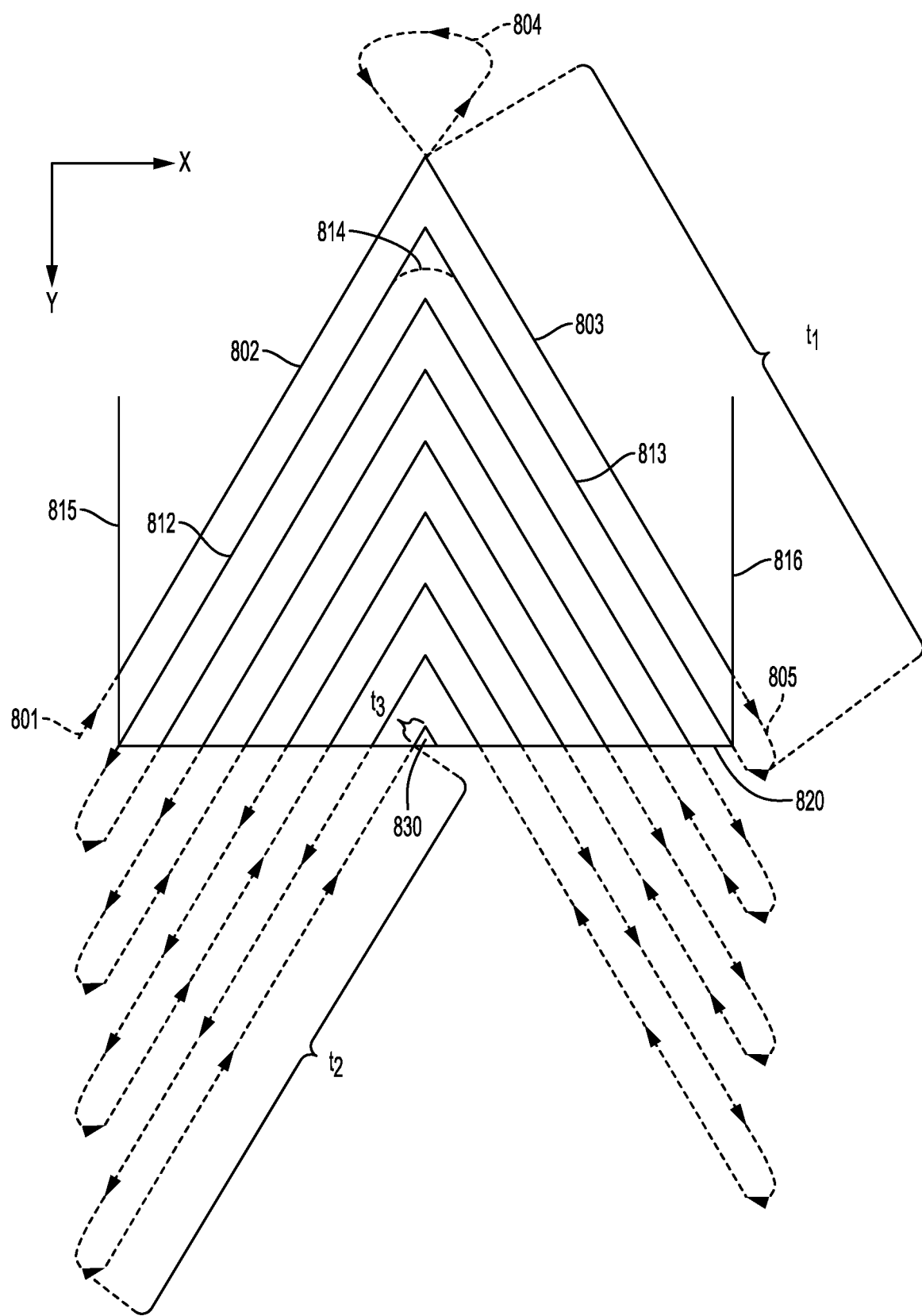
FIG. 16 is a top view depicting an example hatch and stripe pattern and an example path of the energy source using an example dwell path in accordance with another aspect of the disclosure.

When forming the triangular portion of the stripe region, as shown in FIGS. 15 and 16, for example, each solidification line may be formed by at least partially melting portions (703, 802) and (702, 803) as a first substantially linear solidification line and a second substantially linear solidification line respectively. As shown, for example in FIG. 16, the solidification lines 802 and 803 may be in close proximity to the next set of formed solidification lines 812 and 813. In at least one embodiment, if the laser and/or energy source melts the powder corresponding to each of portions 802, 803, 812, and 814 in succession, the portions 802, 803, 812, and 81 may fuse together. For example, when forming portions 802, 803, 812, and 813 a laser and/or energy source may adjusted to control the amount of powder melted along a solidification line; accordingly, a melting width and depth of each solidification line may be controlled. When the laser melts powder corresponding to solidification line 812, the material in the portion 802 may not have cooled and the thin line of powder between the portion 802 and the portion 812 may at least partially melt. The molten material in a solidification line 802 may fuse with the molten material in solidification line 812 and the molten material in solidification line 813 may fuse with the molten material in solidification line 803. The energy source and/or laser may also be controlled so that the heat radiating from the solidification line 802 and solidification line 812 may cause the thin line of powder between solidification lines 802 and/or 803 and solidification lines 812 and/or 813 to sinter together without melting. Further, the scanning of the energy source and/or laser to form, for example, solidification line 802 and solidification line 812 may cause the thin line of powder between the solidification lines 802 and/or 803 and solidification lines 812 and/or 813 to remain unfused without sintering and/or melting.

When forming the individual solidification lines 802, 803, 812, and 813, in an example using a laser as the energy source, a galvanometer scanner may guide the laser over a path starting at 701 (FIG. 15) and/or 801 (FIG. 16), for example. In the non-limiting embodiment shown in FIG. 15, the laser may then continue subsequently to portions 702, 703, 704 and/or 719, 705, 707, 708 and 409. When forming the abovementioned portions, the laser is turned off, defocused and/or decreased in power in the portions of the path represented by dotted lines (with the exception of the alternative curved solidification portion represented by reference 719 explained further below). For example portions 701, 704, 705, 707 and 709 are portions of the path where the laser is turned off, defocused and/or decreased in power with relation to the solid portions of the path, so when forming solidification lines within the stripe region bounded by stripe boundaries 747 and/or 748, the laser and/or energy source only supplies enough energy to melt the powder and/or at least partially melt the powder within the stripe region.

The leg elimination patterns shown in FIGS. 12, 14, and 15 may be formed using the abovementioned laser and/or e-beam path as shown in FIG. 15. In one embodiment, one of or both of the stripes 747 and/or 748 may either be an imaginary boundary and/or may be formed as a solidification line. An energy source (e.g. a laser, e-beam, and/or a plurality of lasers and/or e-beams) may be focused, increased in power and/or turned on while within the stripe region having stripe boundaries 747 and/or 748; accordingly, while a specific stripe region is being formed, solidification lines are only formed within a stripe region bounded by stripe boundaries 747 and 748. When the path of the energy source is scanned outside of the boundaries of the stripe region (e.g. portions 701 and 705) the energy source is turned off, defocused and/or decreased in power so that full melting and solidification does not occur. As an alternative, the stripe boundaries 747 and/or 748 may also be at least partially melted and solidified by a laser or energy source and formed as solidification lines either before, after, or during a scan and solidification process within the stripe region.

An exemplary path of the energy source is shown in FIG. 15. When forming the individual solidification lines (e.g. 702 and 703) of the series of solidification lines shown, the energy source may be guided over a path starting at 701, and continue subsequently to portions 702, 704, 703, and 705. The energy source may be turned off, decreased in power, and/or defocused (hereinafter interchangeably referred to as skywriting and/or skywritten) over the path portions designated by reference numbers 701, 704, 705, 707 and 709, for example. As an alternative, the galvanometer scanner or other energy source guiding mechanism may also guide the energy source (e.g. laser) over a path starting at 701, form a first solidification line 702 and form a curved solidification portion (an example of which is shown by reference 719) before forming a second solidification line 703. In this alternative, the energy source may form a solidification line 702 and continuously form a curved solidification portion (an example of which is shown by reference 719) and solidification line 703. It is noted that while FIG. 15 shows the alternative curved solidification path 719 as a broken line between only two solidification lines, the curved solidification path, such as shown in reference 719 may be formed by the energy source guiding portion for each subsequent series of solidification lines thereby connecting each of the solidification lines with a curved solidification path instead of forming a point (e.g. the intersection between solidification lines 702 and 703) at the intersection of each set of solidification lines. As yet another alternative, solidifications lines 702 and 703 may be formed continuously without the energy source being turned off, defocused and/or decreased in power. Forming solidification lines 702 and 703 continuously, without any skywriting or without forming a curved solidification portion (e.g. 719) between the two solidification lines. This alternative may be most advantageous when the incident angle between the each solidification line (e.g. 702 and 703 is sufficiently large. In one example, a set of solidification lines (e.g. 702 and 703) are formed continuously, without skywriting (e.g. 704) between the two solidification lines when the incident angle between the subsequent solidification lines is greater than 120°. Further, the two segments may be formed continuously, without skywriting between the two solidification lines, when the incident angle between the two subsequent solidification lines is greater than 150°. Further, it is noted that each of the abovementioned alternative paths (e.g. skywrite 704, curved solidification path 719 and/or continuously formed solidification lines without a curved solidification path or skywrite between two sets of angled solidification lines) may be formed either consistently throughout the stripe, layer and/or the build, or the abovementioned paths may be used in any combination either within a stripe, within a build layer, and/or throughout the build.

As shown in FIG. 15, when the energy source scanning path and solidification lines are proximal to a portion a third boundary 718 (e.g. a contour scan, the end of the component to be built and/or a stripe boundary), a third solidification line 706 is formed. The third solidification line 706 may be substantially parallel to a the series of solidification lines represented by reference 703. However, solidification line 706, and the subsequent series of solidification lines may be formed using a substantially linear energy source that does not change direction (e.g. segment 706), while at least partially melting the powder. In other words, solidification lines 706 are formed from a stripe boundary 747 to a solidification line 791 without changing direction. The remainder of the solidification lines (e.g. 706) may then be formed as though solidification line 791 is a stripe boundary. Accordingly, once the scanning strategy switches to the leg elimination portion of the scan pattern, the energy source skywrites in portion 707 when it passes solidification line 791 at point 792, for example. It is notes that in the abovementioned embodiment using a curved solidification portion 719, the line segment 706 may be bounded by the curved solidification portion 719 such that skywriting occurs once the energy source path passes the intersection point 706B of the curved solidification portion 719 and the segment 706.

It is noted the abovementioned scan pattern is not limited to one energy and/or laser source, and may be performed by a plurality of energy and/or laser sources. For example, a first laser may form solidification lines 702 and 703, and a second laser may form solidification line 706.

The abovementioned process may be repeated for each subsequent layer. For example, subsequent layer 715 (FIG. 14) may include a stripe region having width 714D which is at least partially filled using solidification lines formed parallel with exemplary solidification lines 760A and 750A which are formed at an a angle other that 90° with relation to, and bounded by stripe boundaries of a stripe region. Exemplary solidification lines 760A and 750A two segments that are angled $\theta_3$ with relation to one another. As mentioned above, when the laser scanning path is proximal to a portion a third boundary (e.g. a boundary other than the stripe boundaries for solidification lines 760A and 750A), a third series of solidification lines 760B are formed that are substantially parallel with solidification line 760A. Solidification lines 760B is formed using a substantially linear laser path (e.g. the path does not change direction while forming the solidification line) continuing to a solidification line 750A without changing direction.

The abovementioned leg elimination scan strategy may be used in combination with or as an alternative to any of the abovementioned scan strategies. Further, depending on the geometries and desired properties of the component being build using the AM process, each layer may include a plurality of stripe regions, wherein each stripe region is filled using any one of or combination of the abovementioned strategies depending on any one or combination of reasons including, for example: a part geometry, a decrease in build time, to control the heat buildup within the powder and/or to increase the efficiency of the build, to improve and/or control the material properties of the solidified material, to reduce stresses in the completed material, and/or to reduce wear on the laser, e-beam and/or galvanometer scanner.

In another embodiment, a dwell pattern may be used in combination with or as an alternative to the above mentioned leg elimination strategy, a dwell method as shown in FIG. 16, for example, may be used to control the heat buildup between each solidification line as well. As an example, each solidification line may be formed by at least partially melting portions 802 and 803 as a first substantially linear solidification line and a second substantially linear solidification line respectively. Solidification lines 802 and 803 may be in close proximity to the next set of formed solidification lines 812 and 813. In at least one embodiment, if the laser and/or energy source melts the powder corresponding to each of portions 802, 803, 812, and 814 in succession, the portions 802, 803, 812, and 813 may fuse together. As another example, when forming portions 802, 803, 812, and 813 a laser and/or energy source may adjusted to control the amount of powder melted along a solidification line; accordingly, a melting width and depth of each solidification line may be controlled. When the laser melts powder corresponding to solidification line 812, the material in the portion 802 may not have cooled and the thin line of powder between the portion 802 and the portion 812 may at least partially melt. The molten material in a solidification line 802 may fuse with the molten material in solidification line 812 and the molten material in solidification line 813 may fuse with the molten material in solidification line 803. The energy source and/or laser may also be controlled so that the heat radiating from the solidification line 802 and solidification line 812 may cause the thin line of powder between solidification lines 802 and/or 803 and solidification lines 812 and/or 813 to sinter together without melting. Further, the scanning of the energy source and/or laser to form, for example, solidification line 802 and solidification line 812 may cause the thin line of powder between the solidification lines 802 and/or 803 and solidification lines 812 and/or 813 to remain unfused without sintering and/or melting.

An exemplary path of the energy source is shown in FIG. 16. When forming the individual solidification lines (e.g. 802 and 803) of the series of solidification lines shown, the energy source may be guided over a path starting at 801, and continue subsequently to portions 802, 804, 803, 805, 813, and 812. The energy source may be turned off, decreased in power, and/or defocused (hereinafter interchangeably referred to as skywriting and/or skywritten) over the path the paths 801, 804, and 805. As an alternative, the galvanometer scanner or other energy source guiding mechanism may also guide the energy source (e.g. laser) over a path forming a first solidification line 813 and form a curved solidification portion 814 before forming a second solidification line 812. In this alternative, the energy source may form a solidification line 813 and continuously form a curved solidification portion 814 and solidification line 812. It is noted that while FIG. 16 shows the alternative curved solidification path 814 as a dotted line between only two solidification lines, the curved solidification path, such as shown in reference 814 may be formed by the energy source guiding portion for each subsequent series of solidification lines thereby connecting each of the solidification lines with a curved solidification path instead of forming a point (e.g. the intersection between solidification lines 802 and 803) at the intersection of each set of solidification lines. As yet another alternative, solidifications lines 802 and 803 may be formed continuously without the energy source being turned off, defocused and/or decreased in power. Forming solidification lines 802 and 803 continuously, without any skywriting within the stripe or without forming a curved solidification portion (e.g. 814) between the two solidification lines. This alternative may be most advantageous when the incident angle between the each solidification line (e.g. 802 and 803 is sufficiently large. In one example, a set of solidification lines (e.g. 802 and 803) are formed continuously, without skywriting within the stripe (e.g. without skywritten portion 804) between the formation of the two solidification lines when the incident angle between the subsequent solidification lines is greater than 120°. Further, the two segments may be formed continuously, without skywriting within the stripe boundaries between the two solidification lines, when the incident angle between the two subsequent solidification lines is greater than 150°. It is noted that each of the abovementioned alternative paths (e.g. skywrite 704, curved solidification path 719 and/or continuously formed solidification lines without a curved solidification path or skywrite between two sets of angled solidification lines) may be formed either consistently throughout the stripe, layer and/or the build, or the abovementioned paths may be used in any combination either within a stripe, within a build layer, and/or throughout the build.

When forming the individual solidification lines 802, 803, 812, and 813, in an example using a laser, for instance, a galvanometer scanner may guide the laser over a path starting at 801, and continue subsequently to portions 802, 803, 805, 813, and 812. When forming the abovementioned portions, the laser is turned off, defocused and/or decreased in power in portions 801 and 805 so that when forming solidification lines within the stripe region bounded by stripe boundaries 815 and/or 816, the laser and/or energy source only supplies enough energy to the powder to at least partially melt the powder within the stripe region. It is noted that all of the abovementioned scan patterns are not limited to one energy and/or laser source, and may be performed by a plurality of energy and/or laser sources. For example, a first laser may solidification lines 802 and 803, and a second laser may form solidification lines 812 and 813.

Depending on at least a geometry of the layer being built and/or a stripe boundary. It may be desirable to control the heat buildup within the powder and/or in the solidification lines formed on the layer of powder using a dwell strategy. For instance, when using the triangle hatch pattern disclosed above, a part boundary or other barrier 820 may be reached at the end of the stripe region when the forming a series of solidification lines (e.g. 802, 803, 812, and 813) within a stripe region bounded by stripe boundaries 815 and 816. As each solidification line gets shorter near the part boundary or other barrier 820, the powder which is at least partially melted to form solidification lines may have insufficient time to cool before the next set of solidification lines are formed. If insufficient sufficient cooling time between the forming of solidification lines occurs, a high energy density portion 830 of the AM build may formed. If the high energy density region, is not accounted for during a build process by decreasing the amount of energy and/or increasing the amount of time during which the energy source is at least partially melting powder, boiling porosity or other defects in the completed AM build may occur. As discussed above, one method of preventing boiling porosity is to form the solidification lines in a pattern that minimizes concentrated heat build-up (e.g. the leg elimination strategy discussed above). Another method of preventing excessive heat buildup is to have the energy source continue on the same path while the energy source is turned off and/or defocused as described below.

As shown in FIG. 16, solidification lines 802 and 803 may be formed by an energy source path having a length and time $t_1$. As shown, solidification lines 802 and 803 are formed with the energy source at least partially melting and forming solidification lines over most of the length $t_1$. When the possibility of a high density region occurs, for example near a boundary, stripe or other portion of the build 820, the length and time over which melting occurs is shortened for each subsequent segment, and the time and distance over which the energy source follows the path without melting is increased. For example, when the solidification lines nearest to portion 830 are formed, the scanning path remains the same or similar to the scanning length $t_1$, but the energy source is primarily not melting and/or partially melting (e.g. over distance $t_2$) and is only melting over a short period of the span (e.g. $t_3$). By increasing the time over which melting is not occurring by continuing over substantially the same path, the solidification lines formed closest to portion 830 are allowed to cool sufficiently before the next subsequent solidification lines are formed. Thus the heating and cooling properties of the powder during formation of the solidification lines near portion 830 can be controlled so as to be similar to the heating and cooling properties of the powder when solidification lines 802, 803, 813, and 812 are formed. By employing the abovementioned strategy, improvements in the control of the heat buildup within the powder and/or control the material properties of the solidified material to reduce stresses in the completed material can be achieved.

Father, advantages such as reduced wear on the laser, e-beam and/or galvanometer scanner can also be realized.

Because an increase in build time may result using the abovementioned strategy, the dwell strategy, an example of which is shown in FIG. 16, may be used in combination with any of the abovementioned strategies. For example the dwell strategy may be used at a portion of the build where the abovementioned leg elimination strategy is not practical. Further, the strategy may be used in combination with or as an alternative to any of the abovementioned scan strategies for any reason. For instance, depending on the geometries and desired properties of the component being build using the AM process, each layer may include a plurality of stripe regions, wherein each stripe region is filled using any one of or combination of the abovementioned strategies depending on any one or combination of reasons including, for example: a part geometry, a decrease in build time, to control the heat buildup within the powder and/or to increase the efficiency of the build, to improve and/or control the material properties of the solidified material, to reduce stresses in the completed material, and/or to reduce wear on the laser, e-beam and/or galvanometer scanner.

In an aspect, the present invention further relates to a method of forming solidification lines and a stripe pattern used in additive manufacturing techniques which may be of the present invention incorporated or combined with features of other powder bed additive manufacturing methods and systems. The following patent applications include disclosure of these various aspects and their use:

U.S. patent application Ser. No. 15/406,467, titled "Additive Manufacturing Using a Mobile Build Volume,", and filed Jan. 13, 2017.

U.S. patent application Ser. No. 15/406,454, titled "Additive Manufacturing Using a Mobile Scan Area,", and filed Jan. 13, 2017.

U.S. patent application Ser. No. 15/406,444, titled "Additive Manufacturing Using a Dynamically Grown Build Envelope,", and filed Jan. 13, 2017.

U.S. patent application Ser. No. 15/406,461, titled "Additive Manufacturing Using a Selective Recoater,", and filed Jan. 13, 2017.

U.S. patent application Ser. No. 15/406,471, titled "Large Scale Additive Machine,", and filed Jan. 13, 2017.

The disclosures of these applications are incorporated herein in their entirety to the extent that they disclose additional aspects of powder bed additive manufacturing methods and systems that can be used in conjunction with those disclosed herein.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various embodiments described, as well as other known equivalents for each such aspect, can be mixed and matched by one of ordinary skill in the art to construct additional embodiments and techniques in accordance with principles of this application.

What is claimed is:

1. A method for fabricating an object, comprising:
   (a) irradiating a portion of a given layer of powder to form a fused region;
   (b) providing a subsequent layer of powder over the given layer of powder; and
   (c) repeating steps (a) and (b) until the object is formed, wherein in irradiating the portion of the given layer of powder, a scanner follows a first irradiation path bounded by a stripe region having at least one first stripe boundary, wherein the first irradiation path forms a first solidification line that is formed at an angle other than 90° relative to the at least one first stripe boundary, and the first irradiation path further forms a second solidification line, wherein the second solidification line is formed at a first angle other than 0° and 180° with respect to the first solidification line such that an intersection point results between the first solidification line and the second solidification line, and wherein a first skywriting path shares an endpoint on the least one first stripe boundary with the first solidification line, and wherein the scanner follows a second skywriting path between the first solidification line and the second solidification line.

2. The method of claim 1, wherein the at least one first stripe boundary is formed at least in part as a solidification line.

3. The method of claim 1, wherein irradiation of the subsequent layer of powder follows a second irradiation path bounded by a second stripe region having at least one second stripe boundary, wherein the second irradiation path forms a third solidification line that is formed at an angle other than 90° relative to the at least one second stripe boundary, and the second irradiation path further forms a fourth solidification line formed at a second angle other than 0° and 180° with respect to a third solidification line, wherein the first angle and second angle are not the same.

4. The method of claim 3, wherein the first angle and the second angle differ by 10° or more.

5. The method of claim 4, wherein each instance of the given layer of the object includes the first angle and each instance of the subsequent layer includes the second angle that differs by 10° or more from the first angle.

6. The method of claim 1, wherein the at least one first stripe boundary is a plurality of parallel stripe boundaries.

7. A method for fabricating an object, comprising:
   (a) irradiating a portion of a given layer of powder to form a fused region;
   (b) providing a subsequent layer of powder over the given layer of powder; and
   (c) repeating steps (a) and (b) until the object is formed, wherein in irradiating the portion of the given layer of powder, a scanner follows a first irradiation path, wherein the first irradiation path forms a first solidification line, performs a first change of direction, and further forms a second solidification line, wherein the second solidification line intersects the first solidification line and forms a first oblique angle with respect to the second solidification line, and wherein the scanner follows a skywriting path between the first solidification line and the second solidification line;
   wherein in providing the subsequent layer of powder, the scanner follows a second irradiation path wherein the second irradiation path forms a third solidification line, performs a second change of direction, and further forms a fourth solidification line, wherein the fourth solidification line intersects the third solidification line and forms a second oblique angle with the third solidification line, wherein the first angle and second angle are not the same.

8. The method of claim 7, wherein the first irradiation path is bounded by a first stripe region having at least a first stripe boundary and a second stripe boundary, wherein the first solidification line is formed at an angle other than 90° with respect to the first stripe boundary and the second solidification line is formed at an angle other than 90° with respect to the second stripe boundary.

9. The method of claim 7, wherein the first angle and the second angle differ by 10° or more.

10. The method of claim 8, wherein the first stripe boundary and the second stripe boundary are linear and substantially parallel.

11. The method of claim 8, wherein the second irradiation path is bounded by a second stripe region having at least a third stripe boundary and a fourth stripe boundary, wherein the third solidification line is formed at an angle other than 90° with respect to the third stripe boundary and the fourth solidification line is formed at an angle other than 90° with respect to the fourth stripe boundary.

12. The method of claim 1, wherein the second skywriting path begins and ends at the intersection point.

13. The method of claim 1, wherein the scanner follows the first irradiation path and wherein the intersection point is a change of direction of the scanner.

14. The method of claim 7, wherein an energy source is turned off over the skywriting path.

\* \* \* \* \*